Sept. 10, 1929.　　　W. DUBILIER　　　1,728,045
CONTROLLING DEVICE
Filed Sept. 11, 1926　　　4 Sheets-Sheet 1
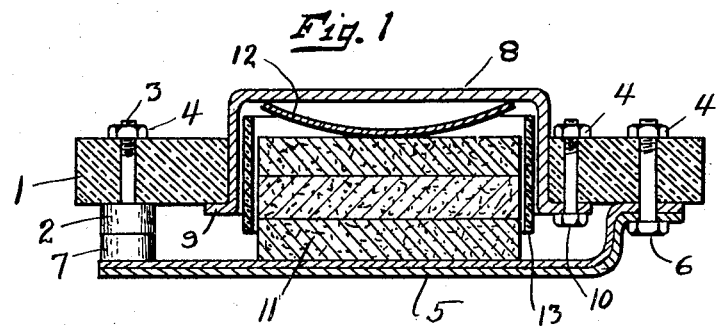
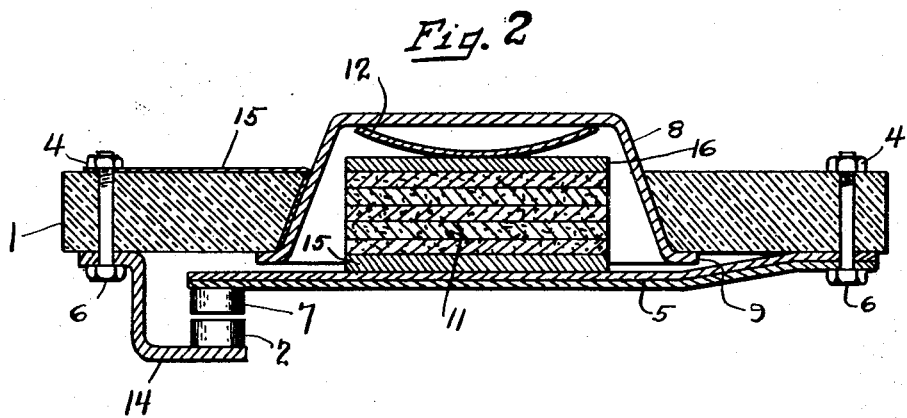
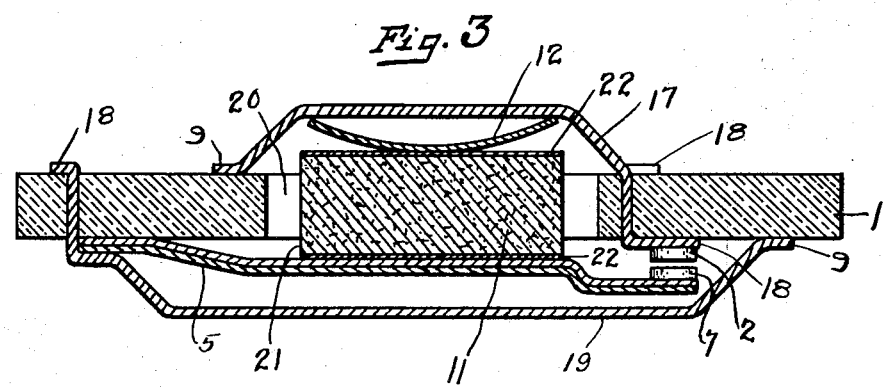
INVENTOR
William Dubilier
BY
John B. Brady
ATTORNEY.

Sept. 10, 1929.   W. DUBILIER   1,728,045
CONTROLLING DEVICE

Filed Sept. 11, 1926   4 Sheets-Sheet 2

Inventor
William Dubilier
By John B. Brady
Attorney.

Sept. 10, 1929.　　　W. DUBILIER　　　1,728,045
CONTROLLING DEVICE
Filed Sept. 11, 1926　　　4 Sheets-Sheet 3
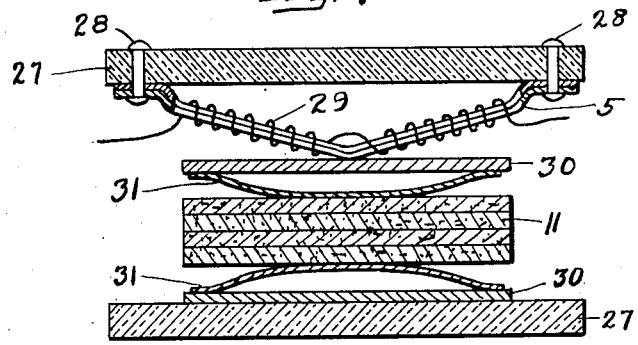
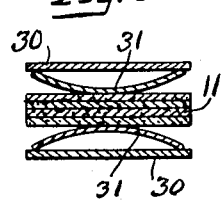
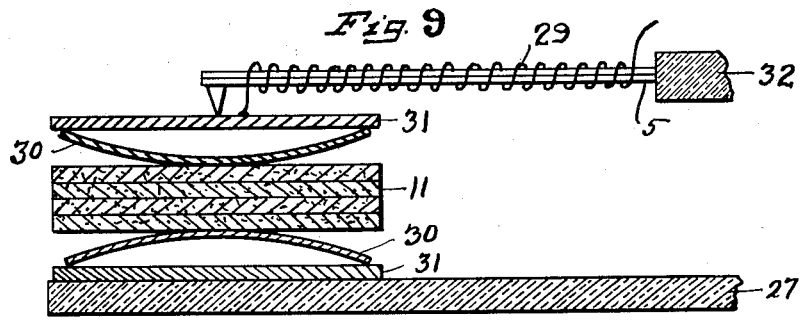
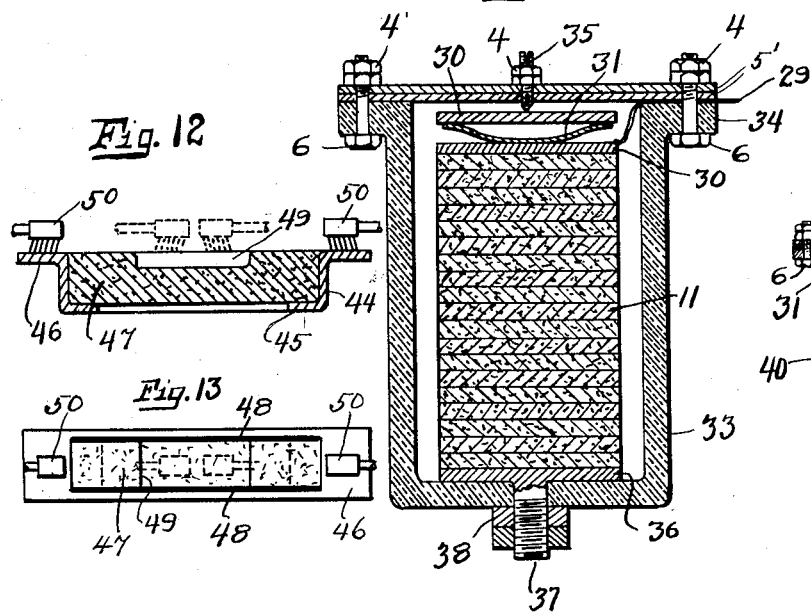
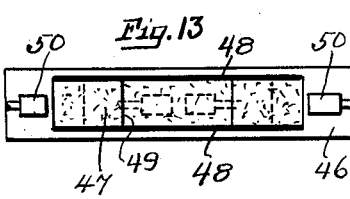
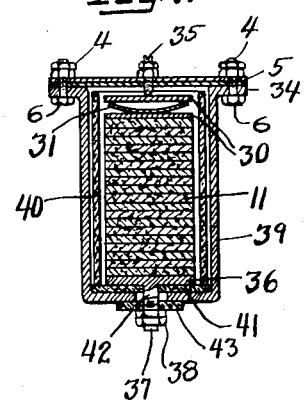
Inventor.
William Dubilier.
By John O. Brady
Attorney Sept. 10, 1929. W. DUBILIER 1,728,045
CONTROLLING DEVICE
Filed Sept. 11, 1926 4 Sheets-Sheet 4
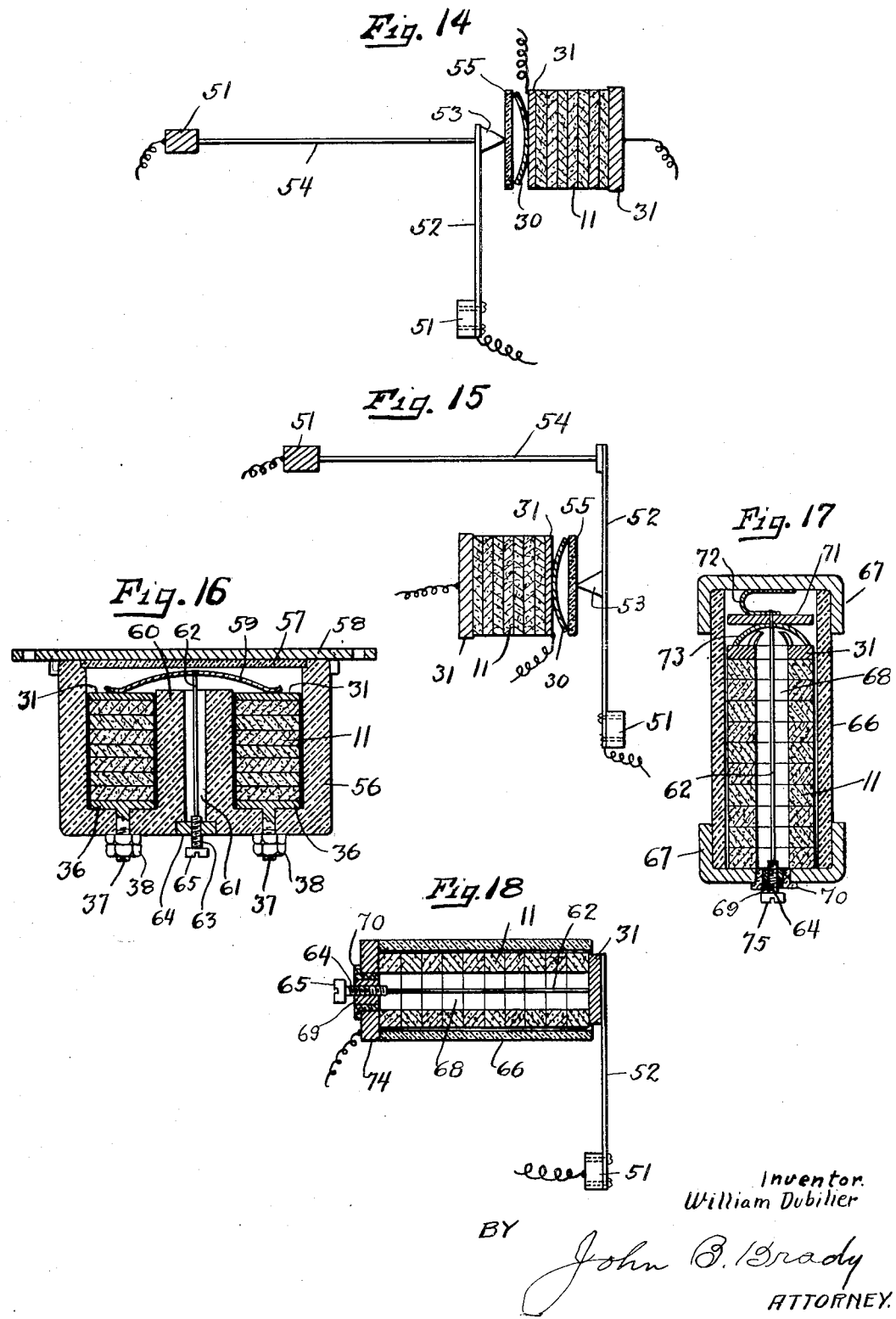

Patented Sept. 10, 1929.

1,728,045

UNITED STATES PATENT OFFICE.

WILLIAM DUBILIER, OF NEW ROCHELLE, NEW YORK.

CONTROLLING DEVICE.

Application filed September 11, 1926. Serial No. 134,927.

My invention relates to improvements in controlling devices; especially controlling devices for electric circuits.

An object of the invention is to provide a controlling device comprising a resistor the effect of which is varied according to the position of the parts of the device; and particularly by the degree of mechanical pressure exerted upon said resistor.

Another object of this invention is to introduce in such devices a variable resistance element which will effectively reduce sparking at contacts.

A further object of this invention is to provide a controlling device that is simple and efficient, but easy and inexpensive to produce.

The nature of the invention is set forth in the accompanying drawings and the novel features pointed out in the appended claims. But the disclosure is for purposes of explanation only, and I may resort to changes in construction, not actually shown herein, but nevertheless embraced within the principle of my invention, as the same is defined by the broad and general meanings of the terms in which the appended claims are expressed.

On the drawings which present several embodiments of the invention:

Figures 1, 2 and 3 are cross sections of separate forms of my invention; the last being adapted for use in an ordinary lamp socket;

Figures 7 and 8 show in section an additional modification; and

Figure 4:
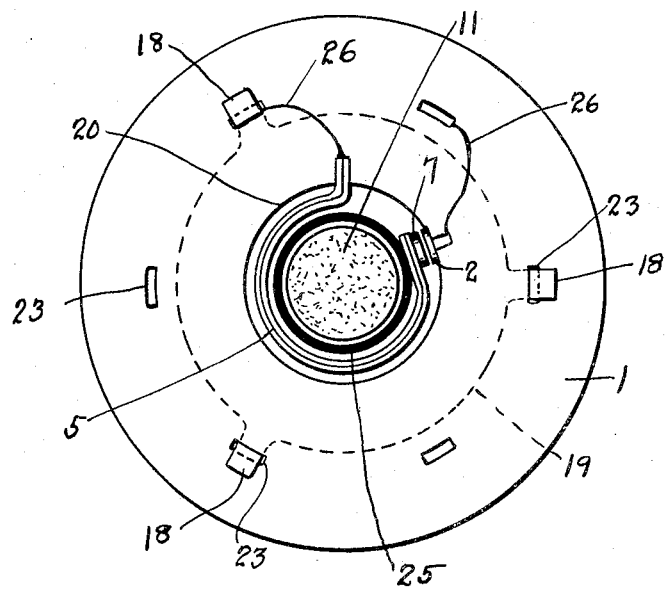
Figures 4 and 5 are respectively a top view with cover removed, and a cross section of another modification.

Figure 9 a similar device with more alterations;

Figures 10 and 11 are longitudinal sections of other forms of my invention;

Figures 12 and 13 are respectively a side and a top view of a controlling device with a resistor not operating under pressure; and Figures 14, 15, 16, 17 and 18 are sections each showing yet another modification.

The same numerals identify the same parts throughout.

The controlling device shown in Figure 1 comprises a support of insulation in the form of a disk 1, carrying on one face a fixed contact 2, attached by means of a threaded stem 3 and nut 4. To the same face of the body 1 is also secured a bimetallic member 5, by a bolt 6 and nut 4; and the end of this member bears a contact 7 to cooperate with the contact 2. This bimetallic member is made; as is well known, of two layers of metal having different coefficients of expansion. The disk 1 has a central opening in which is placed a cap 8, the top of which projects beyond the opposite face of the disk, and which has a rim 9 to engage the edge of this opening on the same face as the contact 2. A bolt 10 through the rim 9 and disk 1 and nut 4 hold the cap 8 in position. In the cap 8 is a pile of carbon or other blocks 1 and a spring washer or resilient element 12 between the blocks and the cap 8 presses the blocks against the member 5. An insulating sleeve 13 encircles the blocks 11 in the cap 8.

One side of the circuit in which this device is to be put may be connected to the cap and the other to the contact 2. Then, if the member 5 normally holds the contacts together, the two layers of the strip 1 will be so arranged that the flow of current through the resistor comprising the blocks 11, heating the strip, will cause the member 5 to bend and separate the contacts. Then the thermally-responsive member 5 cools, and moves back to make the contacts re-engage. Since at the moment the contacts open the pressure on the carbon blocks is the least, their resistance is at the highest, therefore the sparking will be reduced and the energy of the break will be dissipated in this resistance. Or the member 5 and the contacts 2 and 7 may be in parallel with the blocks 11 and the member 5 made to act to bring the contacts together on heating and separate them on cooling. Then current through the blocks, heating the member 5 will close the contacts; whereupon the blocks become short-circuited to allow the member 5 to cool and enable the contacts 2 and 7 to separate.

In Figure 2, the fixed contact 2 is secured on an arm 14 made fast by a bolt 6 and nut 4 to one face of the disk 1. The cap 8 may be somewhat conical in shape, and be connected to the bolt 6 by a conductor strip 15. On the top and bottom of the pile of blocks 11 are metal washers 16 to transmit the current to the whole surface of these blocks. One end of the circuit is connected to the cap, or the bolt securing the arm 14 and the other to the member 5 or the bolt fastening same in place. Current flowing through the blocks 11 to the member causes the contacts 2 and 7 to come together, short-circuiting the resistor blocks, so that that member can cool off and separate the contacts again.

Figure 3 shows a device for insertion into a lamp socket on a lighting line for an incandescent lamp, with the usual screw-threaded neck forming one terminal of the filament and a central terminal connected to the other end of the filament. On one face of the disk 1 is a metal cap 17, with rim 9, and projections 18 to pass through slits in the disk 1 and be bent over at their extremities and hold the cap on the disk. One of these projections on the opposite face of the disk carries the contact 2. On the opposite face of the disk is another metal cap 19, also held by projections 18 in the same way. Under the cap 19 is the member 5, made fast by being engaged at one end under the rim of the cap 19; and between the member 5 and the cap 17 is a carbon block, disposed in an opening 20 in the disk 1. The faces of this block have metal layers 21 and 22 thereon, and a spring washer or the like 13 presses this block against the member 5. If this controlling device be put into a lamp socket comprising a screw-threaded shell connected to one circuit conductor, and a central insulated contact connected to the other circuit conductor; so that one of the caps engages with the central contact of the socket; and the usual incandescent lamp of the kind above mentioned is screwed into such a socket, the threaded metal neck or base of the lamp will connect with the circuit through the usual threaded shell of the socket, and the central terminal of the lamp will make contact with the other cap of the device and both ends of the filament will thus be connected to receive current. When the contacts 2 and 7 are separated, the current will flow through the cap 17, block 11, member 5 and cap 19 to the middle terminal of the lamp, heating the member 5 and causing it to move the contact 7 against the contact 2. Then the lamp will glow, and at the same time the resistor block 11 will be short-circuited, enabling the member to cool off, open the circuit, and cause the lamp to go out till the circuit is closed again. The caps 17 and 19 are the terminals of the device.

Figure 5:
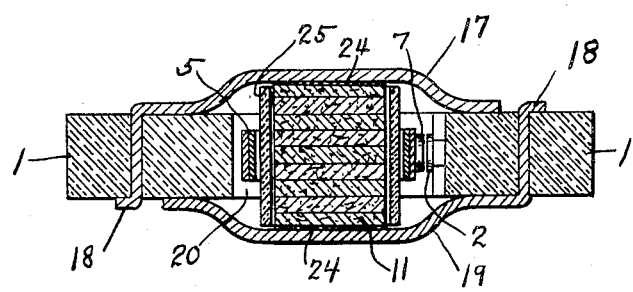
Figure 6:
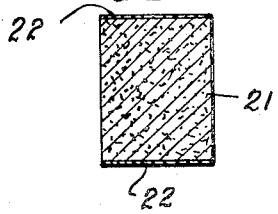
Figure 6 is a view of a further form of resistor.

In Figures 4 and 5, the central opening 20 of the disk 1 contains a curved bimetallic member 5, one end of which is forced into a recess in the side of the opening to mount the member. In the side of this recess there is also mounted the fixed contact 2. Caps 17 and 19 are on the two faces of the disk, held fast by projections 18 in the same way as described in connection with Figure 3; the slots for these projections 18 being shown at 23. In the opening, surrounded by the member 5 is a pile of carbon blocks 11, with conductive washers 24 to connect them with the two caps; and an insulating cylinder or sleeve 25 may surround the pile between it and member 5. Wires 26 connect the contact 2 to one cap and the member 5 to the other. This device will also work in a standard lamp socket, and the caps 17 and 19 constitute the terminals of the device as before. The pressure on the resistor 11 does not change. When the device is in operation, current flows from one cap to the other through the blocks 11, heating the member 5. This member then moves the contact 7 against the contact 3, short-circuiting the blocks 11, whereupon the member 5 cools and separates the contacts 2 and 7 and the operation repeats itself. In Figure 6 a single round block 21 of carbon is shown to take the place of the blocks 11; and this block 21 has metallic layers on its two faces, as in Figure 3. This device will also act as a lamp or electric sign flasher.

In Figure 7, an insulating support 27 has a bimetallic member 5 fastened to the support at the ends of the member by rivets 28; the member being bent away from the support 27 at the middle. Adjacent the support is another support 27 of insulation towards which the member 5 is presented. The member 5 is provided with a coil of heater wire 29, and between the two supports is a pile of carbon blocks 11. Each end of the pile has a spring washer 30 engaging it, and the washer or contact is engaged by a contact or pressure plate 31. When current flows through the coil 29, the member 5 is heated and tends to bend further away from or towards the support carrying it. Thus pressure is exerted on the blocks 11 and if current flows through these blocks, the current can be varied, because the pressure regulates the resistance of the blocks. In Figure 7, the spring washers are shown more or less flattened, while in Figure 8, the washers are released and have no pressure on them. It will be seen that not only pressure, but also the surface in contact is varied.

Figure 9 shows a similar arrangement, with the blocks on one support 27, and a straight member 5 affixed to another support 32, the blocks 11, with spring washers 30 and pressure plates 31 lying between the member 5 and support 27. The heater wire 29 is coiled around the member 5 and connected to the top plate 31. This device may, for example, keep the flow of current constant with varying voltage by the member 5 being arranged so that it will lift as current heats it, thus increasing the resistance of the pile of blocks 11. Hence, less current will flow through, until the member 5 will reach a steady temperature. The pressure on the blocks 11 is then just sufficient to give a resistance and heating to achieve this temperature. A rise in voltage would tend to increase the current and thus give a slightly higher temperature and hence more rise of the member 5. This rise will reduce the pressure on the blocks, increase the resistance and thus drop the current to substantially the old value.

In Figure 10 I show a cup-shaped insulating casing 33, with an out-turned rim 34 around the mouth or top, which is open. Over the mouth I place a cover 5' which is a bimetallic member with two layers and operates the same way as the member 5 described above. In the middle of this cover is a regulating screw 35, passing through the cover, and bearing nuts 4 to hold it in adjusted position. In the casing is a pile of carbon blocks 11. On top of the pile is a pair of compression plates, the upper engaged by the screw 35, and between these contacts or plates is a spring washer 31. The lower plate 31 is connected to the top or cover 5' by a flexible conductor 29. At the bottom of the pile of blocks 11 is a plate or contact 36 with a threaded stem 37, projecting out through the bottom of the casing, and engaged by nuts 38. Bolts 6 and nuts 4 hold the cover 5' in place. By the screw 35, the resistance of the resistor 11 to be regulated can be set within certain limits, and within these limits the device acts as required. Current flows through the blocks and out by way of the lead 29. The heat in the blocks causes the cover to heat up and rise. Then the pressure on the blocks 11 is diminished, the resistance increases, and the current drops till a steady state is reached. Thus it serves to regulate the current with varying voltage.

The device of Figure 11 has a metal casing 39 with a sleeve of insulation 40 in it surrounding the blocks 11. Between the bottom of the casing and the lower compression plate 36 is a plate of insulation 41; and the bottom of the casing has an opening 42, larger than the stem 37. Between the bottom of the casing and the nuts 38 is a washer of insulation 43. The cover 5' may be mounted on and connected electrically with the casing. The operation is the same as that of the device shown in Figure 10.

In Figures 12 and 13, I show a device for controlling currents by a carbon resistor with two brushes. The numeral 44 indicates a trough-shaped container, open at the bottom, with ledges or shelves 45 inside at the ends of the bottom, and top extended at the extremities as shown at 46. Inside the container is a resistor of carbon or other substance 47, resting at its ends on the shelves 45, and in its upper surface is a depression or recess 49. Insulating strips 48 are between the resistor 47 and the sides of the container. Two contact brushes 50 engage the upper face of the member 46. When these brushes are on the ends 47 of the container, the resistor 47 is not in circuit; but as the brushes 50 move towards each other, they leave the metal ends 46 and put the resistor 47 in circuit to a greater and greater extent, because the current must flow from each brush to the resistor and thence back to the ends of the resistor and through the casing. When the brushes reach the recess in the top of the carbon resistor, the circuit is opened full. The brushes are of course held up against dropping into this recess.

Figure 14 illustrates a resistor of carbon blocks 11, with two end contacts or plates of metal 31 joined to circuit conductors and at one end of the pile or row back of the plate 31 is a spring washer 30, and a pressure plate 55. To a support 51 is attached another conductor of an electric circuit. A similar support 51, with the other connection of the circuit has affixed thereto a flexible member 52 having a pivot 53, and connected to the first support 51 by a hot wire 54. Here the carbon blocks may be in one circuit and the wire 54 in another, and heating of the wire will enable the member 53 to increase the pressure on the blocks to permit more current to flow. Member 53 is of course set to move towards the plate 55.

The device of Figure 15 works in the opposite way, so that when current flows through the wire 54, the member 53, set to move away from the carbon blocks, reduces pressure on the blocks 11.

Figure 16 shows an insulating cup-shaped casing 56, closed at the top by an insulating plate 57, resting on an inside shoulder at the rim; and over this plate 57 is laid and secured in any suitable way a metal plate 58. On the interior of the casing are two piles of carbon blocks 11, in two separate compartments or chambers; and these piles are pressed upon by a spring 59, bent up at the middle towards the plate 57. Between the two piles of blocks is a partition 60, with a bore 61 through it, and to the middle of the spring is connected a wire 62 extending through this bore. The outer end of this wire is attached to a screw 63 engaging a washer 64 set in the outer end of the bore 61 against a shoulder. Under each end of the spring 59 is a compression plate 31 on top of each pile of blocks 11, and the plates 36 at the bottom of these piles have stems 37 and nuts 38. The stems 37 are united to the circuit conductors and one of the circuit conductors may be joined to the wire 62. An electric circuit is connected to the two terminals 37 and is regulated by the heating or cooling and consequent expansion or contraction of wire 62. The screw 65 may be connected to another part of one circuit to give the current necessary for heating.

Figure 17 shows an insulator tube 66, with conductive end caps 67, making a casing for carbon blocks 11. These blocks have central apertures all of which are aligned by the blocks in the casing to make a central bore 68. Through the bore passes a hot wire 62. A screw 64 on one end of this wire turns in a metal bushing 69 in one cap 67, this bushing being insulated from the cap by a sleeve 70. Adjacent the other cap 67 is a perforated metal compression or contact plate 31. A second pressure plate 71 is provided in this part of the casing and between the plate 71 and the adjacent cap 67 is a spring element 72. A spring washer 73 is put between the plate 31 and 71. In this construction, current passes through the blocks 11 only, the circuit being connected to the caps 67, but no current flows through the wire 62. The current nevertheless heats the wire and thus the resistance increases and current decreases automatically as the wire grows warm. This device will regulate the current in the same manner as Figures 9, 10 or 11.

In the device shown by Figure 16, the end of the wire 52 should be able to turn in the spring 59, without being withdrawn, as by being riveted over at its end beyond the spring. The same connection should exist between the wire 62 and the plate 71 in Figure 17.

Figure 18 shows a device with a casing 66 of insulating material as in Figure 17. One end of this casing is closed by a plate 74, carrying the metal bushing 69 and insulating sleeve 70; and at the other end is a contact plate 31, mounted on a member 52 affixed to a support 51. The circuit is through the carbon blocks and plates 31 and 74, and no current flows in the wire 62. But as the wire heats up, the member 52, being so set, pulls back on the plate 31, and increases the resistance of the blocks 11. The operation is therefore the same as in connection with Figure 17.

Having described my invention, what I believe to be new and desire to secure and protect by Letters Patent of the United States is:—

1. A flasher device comprising an insulating member having an opening therein, a carbon block mounted in said opening, a bimetal element having one of its ends secured to said insulating member and cooperating with said carbon block, said bimetal element carrying a movable contact, a second member for holding said carbon block in engagement with said element and a fixed contact carried by said second member in operative relation with said movable contact, said bimetal element being responsive to heat for compressing said carbon block and for simultaneously moving said movable contact into engagement with the fixed contact.

2. In combination, a carbon block, an insulating member, a bimetallic element secured to the insulating member and arranged on one side of said carbon block, a holding member arranged on the other side of said carbon block for holding said block in position, said bimetallic element being arranged upon heating to compress said carbon block, a movable contact carried by said bimetallic element and a fixed contact adapted to be connected to said holding member engaged by said movable contact and disengaged from said movable contact as said bimetallic element compresses said carbon block.

3. In combination, a carbon block, a bimetallic element carrying a movable contact, a fixed contact in operative relation with said movable contact, said contacts comprising a short circuit shunt around said carbon block and means including said bimetallic element for reducing the resistance of said carbon block to a minimum when said contacts are disengaged as a result of the change in temperature of said bimetallic element.

4. In combination, a carbon block, a bimetallic element carrying a movable contact, a fixed contact in operative relation therewith, said contacts comprising a short circuit shunt around said carbon block and means including said bimetallic element for varying the resistance of said carbon block as said contact engages and disengages said carbon block.

5. A flasher device comprising a disc-shaped insulated member having an opening disposed at its center, a bimetallic element carried on one side of said disc, a contactor carried by said bimetallic member, a conducting member secured to said disc and carrying said bimetallic member, a carbon block mounted in the opening of said disc member adapted to be compressed by said bimetallic member and a second conducting member secured to the other side of said disc member and carrying a contactor cooperating with said first contactor.

6. A flasher device comprising a disc-shaped insulated member having an opening disposed at its center, a bimetallic element carried on one side of said disc, a contactor carried by said bimetallic member, a conducting member in operative relation with said bimetallic member, a carbon block mounted in the opening of said disc member and adapted to be compressed by said bimetallic member and a second conducting member carrying a contactor coöperating with said first contactor.

7. In a flasher device for insertion into a lamp socket, a disc, a metal cap on one face of said disc, a bimetallic member, a movable contact mounted on said bimetallic element, a carbon block mounted on said bimetallic member and in said opening, a second metal cap for pressing said carbon block against said bimetallic element, and a fixed contact carried on said second mentioned metal cap and in operative relation with said movable contact carried on said bimetallic element.

8. In a flasher device for insertion into a lamp socket, a disc having slits and a central opening, a metal cap on one face of said disc, having a rim and a projection passing through a slit in said disc for holding said cap on said disc, said cap forming a shoulder, a bimetallic member carried on said shoulder, a movable contact mounted on said bimetallic element, a carbon block mounted on said bimetallic element and in said opening, the opposite faces of said block having metal layers thereon, a second metal cap having a rim and a projection passing through a slit from the opposite side of said disc holding said cap on said disc, a member between said second cap and one of said metal plates of said carbon block for pressing said carbon block against said bimetal element, and a fixed contact carried on the projection of said second mentioned metal cap and in operative relation with said movable contact carried on said bimetal element.

In testimony whereof I affix my signature.

WILLIAM DUBILIER.